United States Patent
Tang

(10) Patent No.: US 8,960,981 B2
(45) Date of Patent: Feb. 24, 2015

(54) BACKLIGHT MODULE

(75) Inventor: Guofu Tang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 140 days.

(21) Appl. No.: 13/807,074

(22) PCT Filed: Jul. 27, 2012

(86) PCT No.: PCT/CN2012/079226
§ 371 (c)(1),
(2), (4) Date: Dec. 27, 2012

(87) PCT Pub. No.: WO2014/008686
PCT Pub. Date: Jan. 16, 2014

(65) Prior Publication Data
US 2014/0218963 A1  Aug. 7, 2014

(30) Foreign Application Priority Data
Jul. 13, 2012 (CN) .......................... 2012 1 0243514

(51) Int. Cl.
*G02F 1/13357* (2006.01)
*G02B 6/00* (2006.01)
*F21V 8/00* (2006.01)

(52) U.S. Cl.
CPC ............ *G02B 6/0035* (2013.01); *G02B 6/0073* (2013.01); *G02B 6/0088* (2013.01)
USPC .......... 362/606; 362/97.4; 362/632; 362/633; 362/634; 349/58; 349/60; 349/61; 349/62; 349/65

(58) Field of Classification Search
CPC ................................................ G02F 1/133308
USPC .............. 362/97.1–97.4, 457, 606–607, 97.2, 362/632–634; 349/58–60, 63, 64, 65
See application file for complete search history.

(56) References Cited

U.S. PATENT DOCUMENTS 6,552,761 B1 *  4/2003  Seo et al. ........................ 349/58
7,244,966 B2 *  7/2007  Fukayama ...................... 257/98
7,639,315 B2 * 12/2009  Kao ................................ 349/58

(Continued)

FOREIGN PATENT DOCUMENTS

CN  101000422 A   7/2007
CN  101308287 A  11/2008

(Continued)

*Primary Examiner* — Douglas W Owens
*Assistant Examiner* — Pedro C Fernandez
(74) *Attorney, Agent, or Firm* — Andrew C. Cheng

(57) ABSTRACT

A backlight module includes: a backplane, a backlight source arranged inside the backplane, a light guide plate arranged inside the backplane to correspond to the backlight source, a reflector plate disposed on a bottom of the light guide plate, an optic film disposed on a top of the light guide plate, and elastic members mounted to the backplane. The optic film has a top edge forming suspension sections and two first sidewalls respectively at left and right sides and each forming lugs. The suspension sections form first through holes. The lugs form second through holes. The backplane forms suspending pegs corresponding to the first through holes. The first through holes are mounted on the suspending pegs and the elastic members securely hold the second through holes and are mounted to the backplane so as to fix the optic films on the light guide plate.

14 Claims, 8 Drawing Sheets

(56) References Cited

U.S. PATENT DOCUMENTS

2005/0254236 A1* 11/2005 Fu et al. .................... 362/186
2009/0033827 A1* 2/2009 Chen et al. .................. 349/58

FOREIGN PATENT DOCUMENTS

| CN | 101435948 A | 5/2009 |
| CN | 101876412 A | 11/2010 |

* cited by examiner

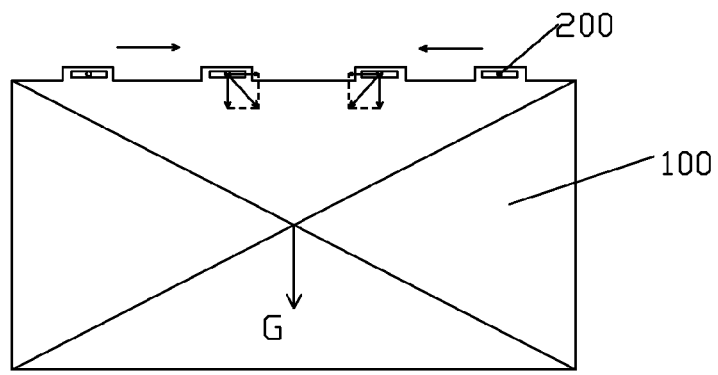
Fig. 1 (Prior Art)
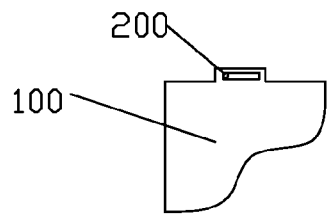 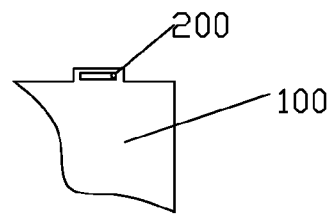
Fig. 2A (Prior Art)    Fig. 2B (Prior Art)
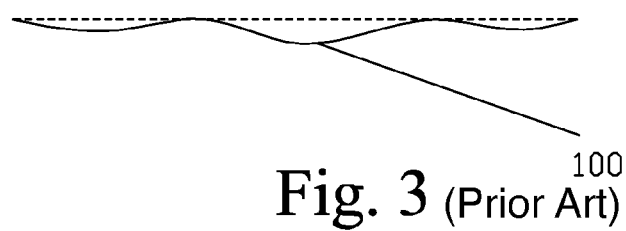
Fig. 3 (Prior Art)

BACKLIGHT MODULE

BACKGROUND OF THE INVENTION

1. Field of the Invention

The present invention relates to the field of liquid crystal display, and in particular to retention of optic films in a backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a backplane to be located rearward of one side of the liquid crystal panel. The LED light bar emits light that enters a light guide plate (LGP) through a light incident face formed at one side of the light guide plate and is projected out through a light emergence face of the light guide plate, after being reflected and diffused, to thereby form a planar light source for the liquid crystal panel.

A backlight source often includes optic films for light diffusion and condensation in order to provide an appropriate light shape. These optic films are generally made of PET (Polyethylene Terephathalate) and have a small thickness, usually between 0.1-0.6 mm, making it very easy to warp. For small-sized backlight modules, the optic films are often formed with lugs on opposite sides for mounting. For large-sized backlight modules, as shown in FIG. 1, an optic film 100 is generally mounted in a suspended fashion. For such a suspension fashion, suspending pegs 200 are usually of a cylindrical form and are uniformly distributed. The suspending pegs 200, which are cylindrical in shape, form point contact with the optic film 100. The portion of the optic film 100 between two suspending pegs 200 shows a gravitational force, which induces a torque with the suspending peg 200 as a fulcrum, causing the optic film 100 to move toward the middle. As shown in FIGS. 2A and 2B, the moving distance is the gap that is preserved between the optic film 100 and the suspending pegs 200. Once the optic film 100 has moved toward the middle, since a gap is present between the optic film 100 and the liquid crystal panel, it is no longer possible to constrain warp of the optic film 100 as shown in FIG. 3 and the image displayed shows inconsistent brightness. To eliminate such a problem, suspending pegs 300 are made in a planar form or the distance between two suspending pegs is shortened. These improve the warp of the optic film 100 to some extents. However, due to general insufficiency of space is available in structure design, it is not possible to unlimitedly shorten the distance between two pegs and the torque caused by gravitational force still exists, as shown in FIG. 4. Further, the optic films are made of PET plastics, they inevitably shows thermal expansion. This makes it impossible to completely eliminate warp of the optic films.

SUMMARY OF THE INVENTION

An object of the present invention is to provide a backlight module, which effectively prevent an optic film from moving toward the middle due to torque caused by gravitational force so as to improve warp of the optic film and enhance image quality.

To achieve the above object, the present invention provides a backlight module, which comprises: a backplane, a backlight source arranged inside the backplane, a light guide plate arranged inside the backplane to correspond to the backlight source, a reflector plate disposed on a bottom of the light guide plate, an optic film disposed on a top of the light guide plate, and a plurality of elastic members mounted to the backplane. The optic film has a top edge forming a plurality of suspension sections. The optic film has two first sidewalls respectively at left and right sides and each forming a plurality of lugs. The suspension sections form first through holes. The lugs form second through holes. The backplane forms a plurality of suspending pegs corresponding to the first through holes. The first through holes are mounted on the suspending pegs and the elastic members securely hold the second through holes and are mounted to the backplane so as to fix the optic films on the light guide plate.

The first sidewalls of the left and right sides of the optic film each form one lug at an upper end thereof.

The elastic members are of a U-shape having an open end delimited by two second sidewalls in which mounting holes are defined. The backplane comprises mounting poles that are formed at locations corresponding to the mounting holes. The elastic members are respectively received through the second through holes and are respectively mounted to the mounting poles via the mounting holes so as to fix the optic film to the light guide plate.

One of the second sidewalls of each of the elastic members has an inside surface forming a retention pawl and another one of the second sidewalls forms a retention hole corresponding to the retention pawl. To install, the retention pawl is set in secured engagement with the retention hole to thereby fix the optic film on the elastic member. The retention pawl is linear and comprises a connection rod and a first barb. The retention hole is rectangular to correspond to the retention pawl.

The two second sidewalls of each of the elastic members comprise a helical configuration formed in an end portion thereof remote from the mounting holes.

The elastic members are made of plastics.
The elastic members are made of rubber or silicone.
Each of the elastic members comprises a bottom plate and two third sidewalls perpendicularly mounted to the bottom plate. The two third sidewalls are mutually perpendicular with an opening being formed in a connection therebetween. The two third sidewalls are arranged to be linear and each has an upper edge forming a second barb. The bottom plate forms a third through hole that is circular.

The backplane forms a mounting hole corresponding to the third through hole. A screw is applied to secure the elastic member to the mounting hole with the second barbs tightly engaging the second through hole formed in the lug to thereby fix the optic film to the light guide plate.

The optic film is provided at top and bottom edges with a plurality of suspension sections and each of the two first sidewalls of the left and right sides forms a lug at each of upper and lower ends thereof. The suspension sections form first through holes. The lugs form second through holes. The backplane forms a plurality of suspending pegs corresponding to the first through holes. The first through holes are respectively mounted to the suspending pegs. The elastic members securely hold the second through holes and are mounted to the backplane so as to fix the optic film to the light guide plate.

The present invention also provides a backlight module, which comprises: a backplane, a backlight source arranged inside the backplane, a light guide plate arranged inside the backplane to correspond to the backlight source, a reflector plate disposed on a bottom of the light guide plate, an optic film disposed on a top of the light guide plate, and a plurality of elastic members mounted to the backplane, the optic film having a top edge forming a plurality of suspension sections, the optic film having two first sidewalls respectively at left and right sides and each forming a plurality of lugs, the suspension sections forming first through holes, the lugs forming second through holes, the backplane forming a plurality of suspending pegs corresponding to the first through holes, whereby the first through holes are mounted on the suspending pegs and the elastic members securely hold the second through holes and are mounted to the backplane so as to fix the optic films on the light guide plate; wherein the first sidewalls of the left and right sides of the optic film each form one lug at an upper end thereof; wherein the elastic members are of a U-shape having an open end delimited by two second sidewalls in which mounting holes are defined, the backplane comprising mounting poles that are formed at locations corresponding to the mounting holes, the elastic members being respectively received through the second through holes and being respectively mounted to the mounting poles via the mounting holes so as to fix the optic film to the light guide plate; and wherein the elastic members are made of plastics.

The efficacy of the present invention is that the present invention provides a backlight module, wherein lugs are formed on sides of the optic films and elastic members are used to securely mount the lugs to the backplane. Through application of spring effect to securely hold at left and right sides, movement of the optic films toward the middle due to torque induced by gravitational force is prohibited thereby overcoming warp of the optic films and improving image quality.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of embodiments of the present invention, with reference to the attached drawings. In the drawings:

FIG. 1 is a schematic view showing the arrangement of a conventional optic film;

FIGS. 2A and 2B are schematic views illustrating positions of a left side and a right side pegs of the conventional optic film after moving toward the middle;

FIG. 3 is a schematic view illustrating warp of the conventional optic film;

DETAILED DESCRIPTION OF THE PREFERRED EMBODIMENTS

Figure 4:
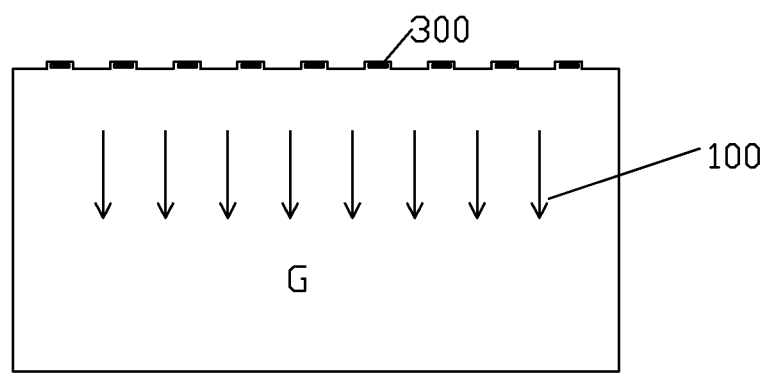
FIG. 4 is a schematic view showing the arrangement of a conventional optic film with suspending pegs being in a planar form.
Figure 5:
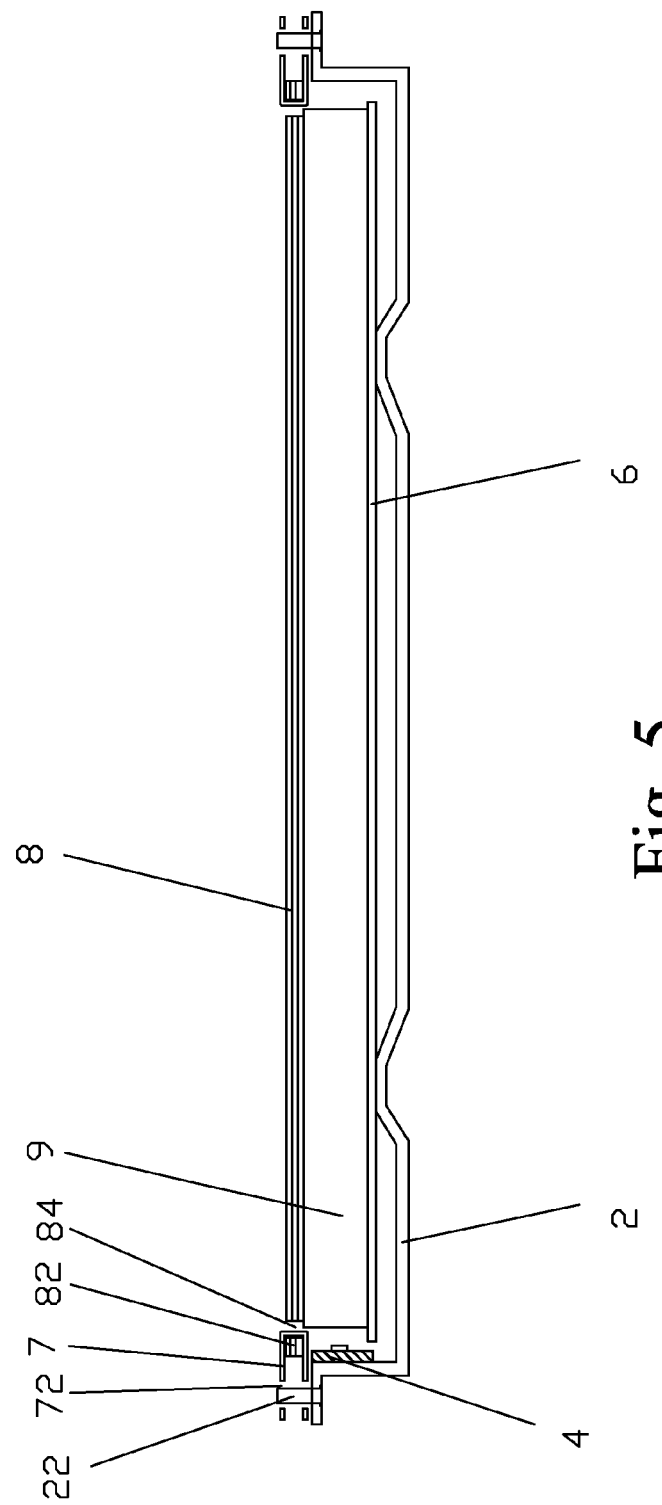
FIG. 5 is a schematic view showing the structure of a backlight module according to the present invention.
Figure 6:
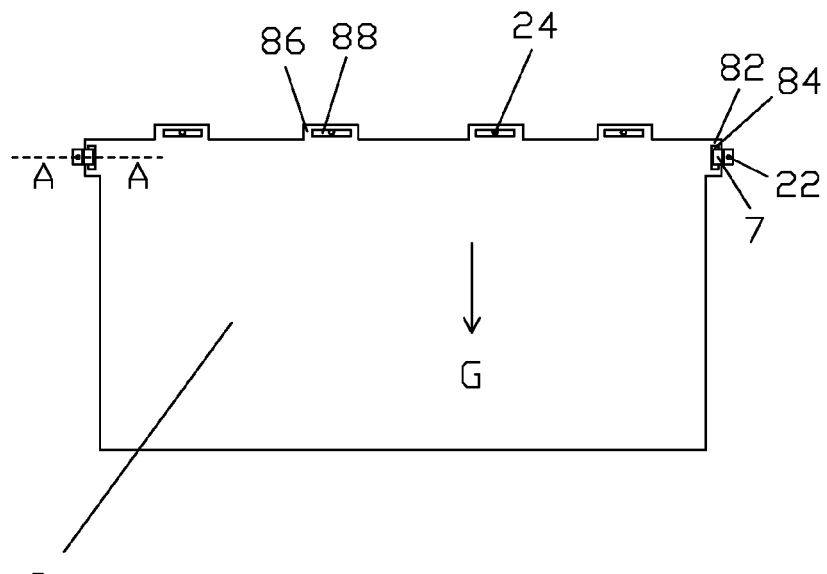
FIG. 6 is a schematic view showing the arrangement of a first embodiment of optic film applied in the backlight module according to the present invention.
Figure 7:
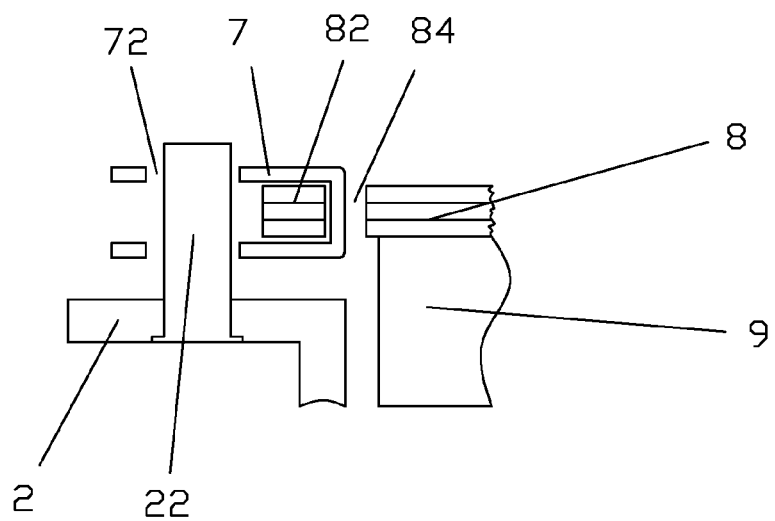
FIG. 7 is a cross-sectional view taken along line A-A of FIG. 6.
Figure 8:
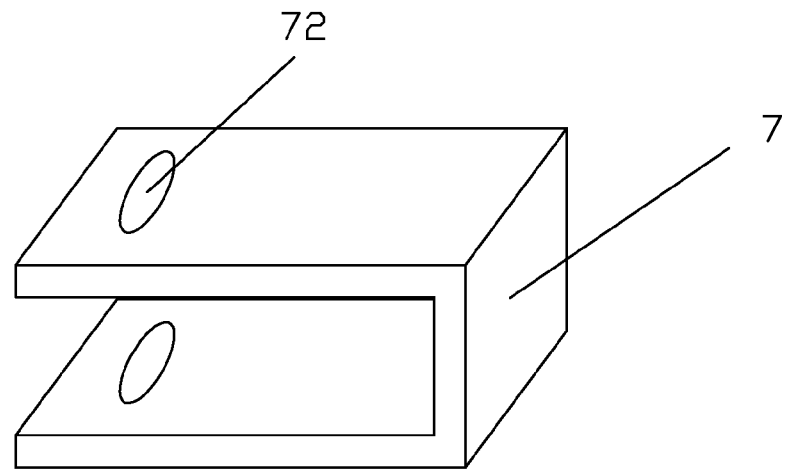
FIG. 8 is a perspective view showing an elastic member of FIG. 6.

To further expound the technical solution adopted in the present invention and the advantages thereof, a detailed description is given to a preferred embodiment of the present invention and the attached drawings.

Referring to FIGS. 5-8, the present invention provides a backlight module, which comprises: a backplane 2, a backlight source 4 arranged inside the backplane 2, a light guide plate 9 arranged inside the backplane 2 to correspond to the backlight source 4, a reflector plate 6 disposed on a bottom of the light guide plate 9, optic films 8 disposed on a top of the light guide plate 9, and a plurality of elastic members 7 mounted to the backplane 2. The optic films 8 have a top edge forming a plurality of suspension sections 86 and left-side and right-side first sidewalls each forming a plurality of lugs 82. Each suspension section forms a first through hole 88 and each lug 82 forms a second through hole 84. The backplane 2 forms a plurality of suspending pegs 24 corresponding to the first through holes 88, whereby the first through holes 88 are mounted on the suspending pegs 24. The elastic members 7 securely hold the second through holes 84 and are mounted to the backplane 2 so as to fix the optic films 8 on the top of the light guide plate 9.

In the instant embodiment, the two first sidewalls of the left side and right side of the optic films 8 each form, at an upper end thereof, a lug 82. The elastic members 7 are of a U-shape having an open end delimited by two second sidewalls in which mounting holes 72 are defined. The backplane 2 comprises mounting poles 22 that are formed at locations corresponding to the mounting holes 72. The elastic members 7 are respectively set through the second through holes 84 and are respectively mounted to the mounting poles 22 via the mounting holes 72 so as to fix the optic films 8 to the light guide plate 9. The mounting holes 72 can be elliptic but are not limited to ellipse. The mounting poles 22 can be bolts but can alternatively be stakes that are integrally formed with the backplane 2.

The elastic members 7 can be made of plastics and in the instant embodiment, the elastic members 7 are made of rubber or silicone.

In assembling, the mounting hole 72 of one of the second sidewalls of each elastic member 7 is first fit over the mounting pole 22. Then, another one of the second sidewalls of the elastic members 7 is put through the second through hole 84 of the optic films 8 and a force is applied to have the mounting hole 72 of said another one of the second sidewalls fit over the mounting pole 22, whereby a pretensioning force is present in the elastic member 7 to securely hold the optic films 8. Both sides of the optic films 8 are held by the elastic members 7 so that movement of the optic films 8 toward the middle due to torque induced by gravitational force is prohibited thereby overcoming warp of the optic films 8 and improving image quality. In the instant embodiment, the mounting poles 22 can be elliptic poles to correspond in shape to the mounting holes 72.

Figure 9:
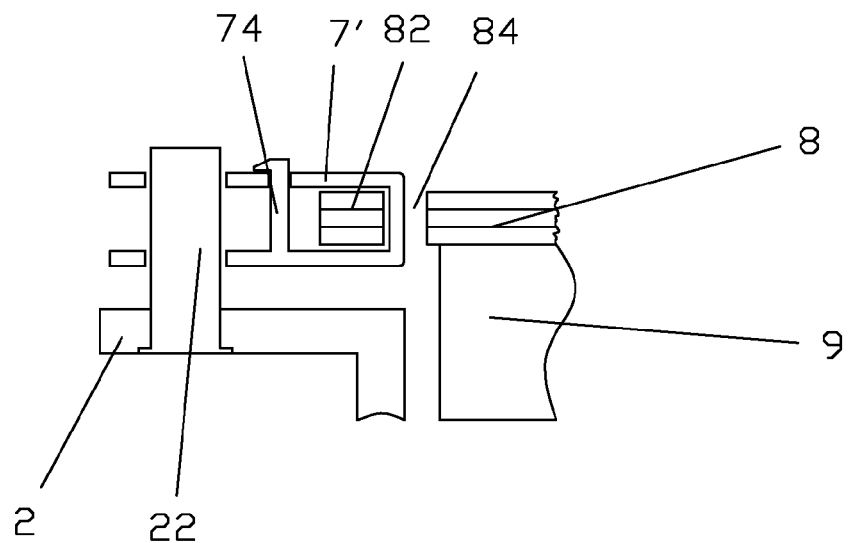
FIG. 9 is a cross-sectional view showing the arrangement of a second embodiment of optic film applied in the backlight module according to the present invention.
Figure 10:
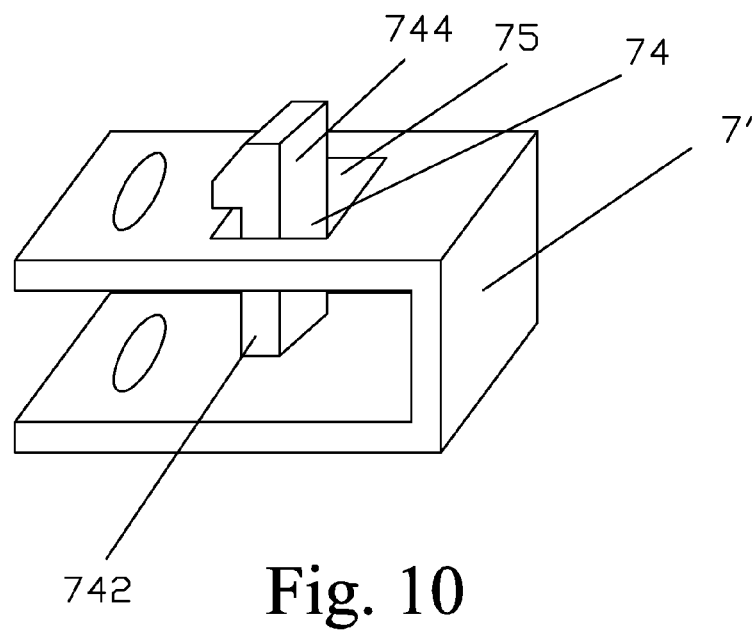
FIG. 10 is a perspective view showing an elastic member of FIG. 9.

Referring to FIGS. 9 and 10, a second embodiment of the present invention is shown. The instant embodiment is based on the first embodiment but further include a structure of retention pawl. In the instant embodiment, the elastic members 7' are of a U-shape of which one second sidewall has an inside surface forming a retention pawl 74 and another second sidewall forms a retention hole 75 corresponding to the retention pawl 74. The retention pawl 74 comprises a connection rod 742 and a first barb 744. The retention hole 75 is rectangular to correspond to the retention pawl 74. To install, the first barb 744 is set in secured engagement with the retention hole 75 to thereby fix the optic films 8 on the elastic member 7'.

Figure 11:
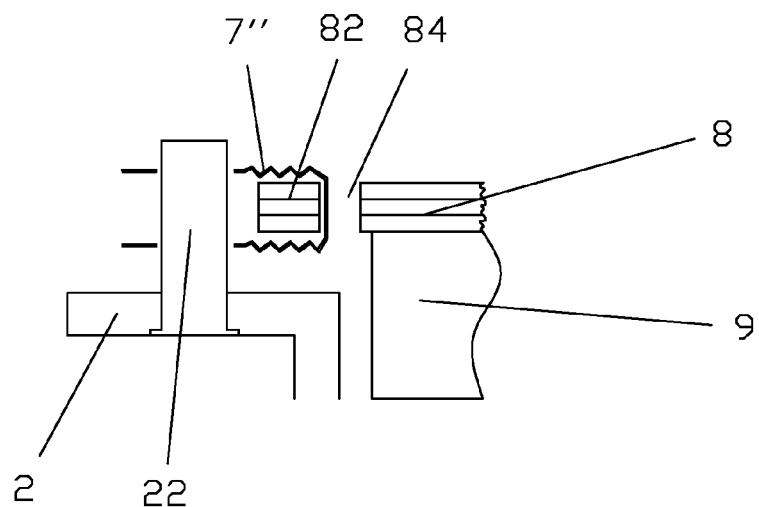
FIG. 11 is a cross-sectional view showing the arrangement of a third embodiment of optic film applied in the backlight module according to the present invention.
Figure 12:
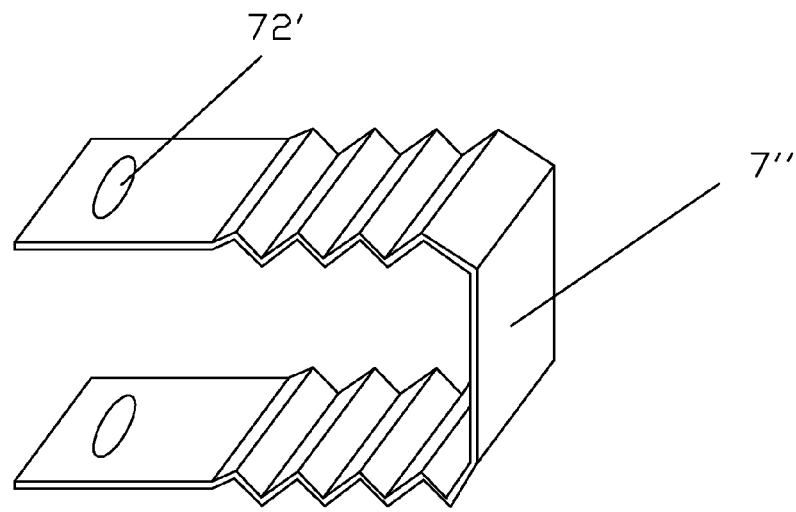
FIG. 12 is a perspective view showing an elastic member of FIG. 11.

Referring to FIGS. 11 and 12, a third embodiment of the present invention is shown. In the instant embodiment, the elastic members 7'' are of a U-shape having two second sidewalls that comprise a helical configuration formed in an end portion thereof remote from mounting holes 72'.

Figure 13:
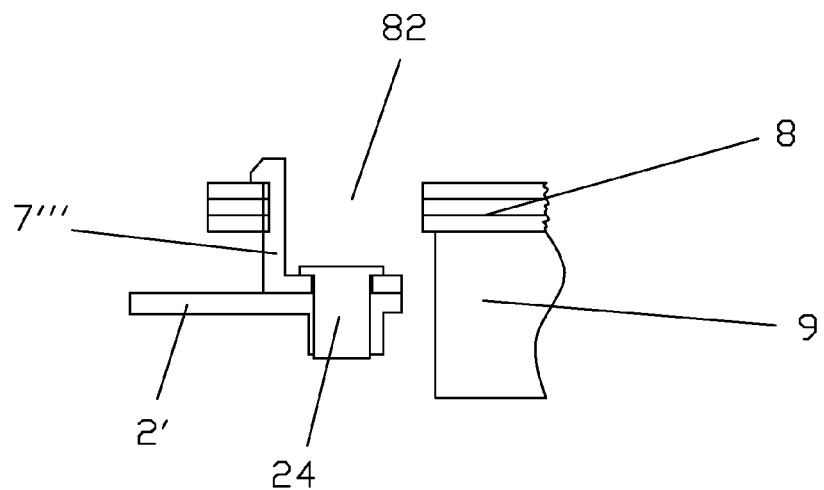
FIG. 13 is a cross-sectional view showing the arrangement of a fourth embodiment of optic film applied in the backlight module according to the present invention.
Figure 14:
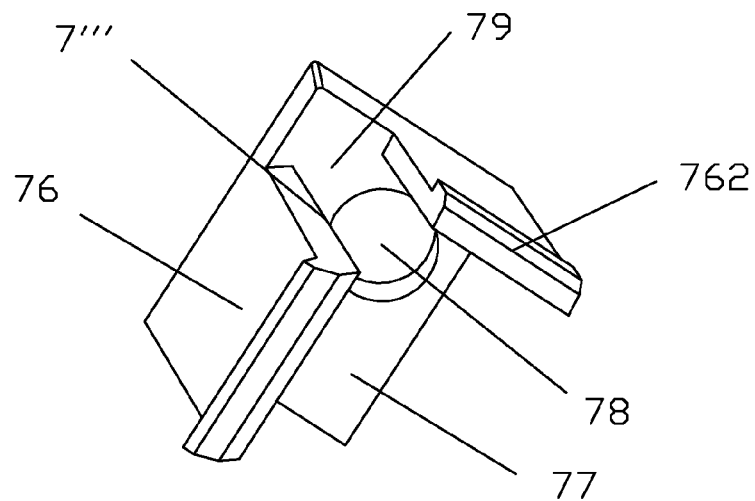
FIG. 14 is a perspective view showing an elastic member of FIG. 13.

Referring to FIGS. 13 and 14, a fourth embodiment of the present invention is shown, in which an elastic member 7''' comprises a bottom plate 77 and two third sidewalls 76 perpendicularly mounted to the bottom plate 77. The two third sidewalls 76 are mutually perpendicular and an opening 79 is formed in a connection between them so as to allow the two third sidewalls 76 to be deflected frontward/rearward or leftward/rightward. The two third sidewalls 76 are arranged to be linear and each has an upper edge forming a second barb 762. The second barb 762 is shaped and sized to correspond to a second through hole 84 of the optic films 8. The bottom plate 77 forms a third through hole 78 that is circular.

The backplane 2' forms a mounting hole (not shown) corresponding to the third through hole 78. A screw 24 is applied to secure the elastic member 7''' to the mounting hole with the second barbs 762 tightly engaging the second through holes 84 formed in the lug 82 to thereby fix the optic films 8 to the light guide plate 9.

To install, the screws 24 are first put through the third through holes 78 to securely mount the elastic members 7''' to the backplane 2'. Then, the optic films 8 are set to have the second through holes 84 aligning with the second barbs 762. By slightly pressing down the optic films 8, the second through holes 84 are set into tight engagement with and thus fixed to the second barbs 762. Through the application of spring effect to tightly hold the optic films 8 at the left and right sides, movement of the optic films 8 toward the middle due to torque induced by gravitational force is prohibited thereby overcoming warp of the optic films 8 and improving image quality.

Figure 15:
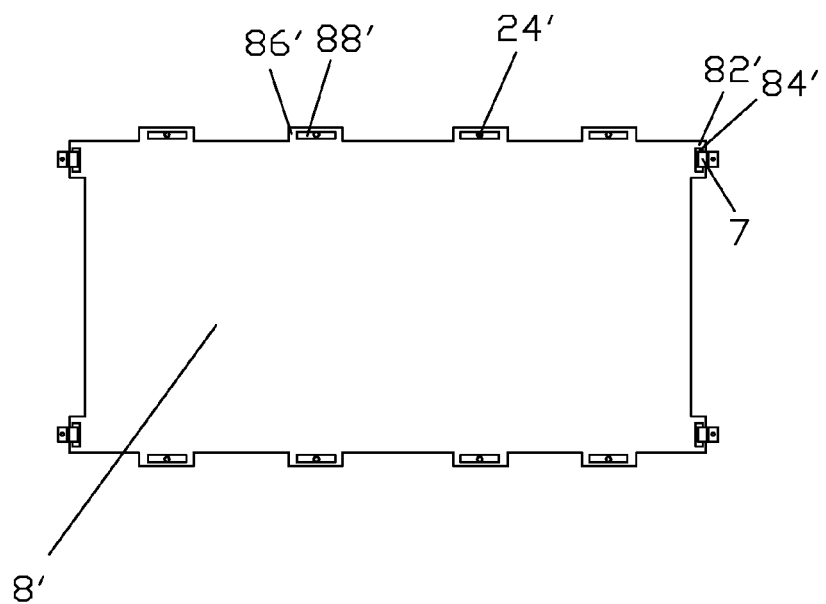
FIG. 15 is a schematic view showing the arrangement of a fifth embodiment of optic film applied in the backlight module according to the present invention.

Referring to FIG. 15, an optional fifth embodiment is shown. The optic films 8' are provided at both top and bottom edges with a plurality of suspension sections 86' and each of the two first sidewalls of the left and right sides forms a lug 82' at each of upper and lower ends thereof. The suspension sections 86' form first through holes 88'. The lugs 82' form second through holes 84'. The backplane forms a plurality of suspending pegs 24' corresponding to the first through holes 88'. The suspension sections 86' are mounted, in a suspending fashion, to the suspending pegs 24'. The elastic members 7 securely hold the second through holes 84' and are mounted to the backplane so as to fix the optic films 8 to the light guide plate 9. The elastic members 7 can be that used in any one of embodiments 1-4.

In summary, the present invention provides a backlight module, wherein lugs are formed on sides of the optic films and elastic members are used to securely mount the lugs to the backplane. Through application of spring effect to securely hold at left and right sides, movement of the optic films toward the middle due to torque induced by gravitational force is prohibited thereby overcoming warp of the optic films and improving image quality.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a backlight source arranged inside the backplane, a light guide plate arranged inside the backplane to correspond to the backlight source, a reflector plate disposed on a bottom of the light guide plate, an optic film disposed on a top of the light guide plate, and a plurality of elastic members mounted to the backplane, the optic film having a top edge forming a plurality of suspension sections, the optic film having two first sidewalls respectively at left and right sides and each forming a plurality of lugs, the suspension sections forming first through holes, the lugs forming second through holes, the backplane forming a plurality of suspending pegs corresponding to the first through holes, whereby the first through holes are mounted on the suspending pegs and the elastic members securely hold the second through holes and are mounted to the backplane so as to fix the optic film on the light guide plate;

wherein the elastic members are of a U-shape having an open end delimited by two second sidewalls in which mounting holes are defined, the backplane comprising mounting poles that are formed at locations conessponding to the mounting holes, the elastic members being respectively received through the second through holes and being respectively mounted to the mounting poles via the mounting holes so as to fix the optic film to the light guide plate; and wherein one of the second sidewalls of each of the elastic members has an inside surface forming a retention pawl and another one of the second sidewalls forms a retention hole corresponding to the retention pawl, whereby to install, the retention pawl is set in secured engagement with the retention hole to thereby fix the optic film on the elastic member, the retention pawl being linear and comprising a connection rod and a first barb, the retention hole being rectangular to correspond to the retention pawl.

2. The backlight module as claimed in claim 1, wherein the first sidewalls of the left and right sides of the optic film each form one lug at an upper end thereof.

3. A backlight module, comprising: a backplane, a backlight source arranged inside the backplane, a light guide plate arranged inside the backplane to correspond to the backlight source, a reflector plate disposed on a bottom of the light guide plate, an optic film disposed on a top of the light guide plate, and a plurality of elastic members mounted to the backplane, the optic film having a top edge forming a plurality of suspension sections, the optic film having two first sidewalls respectively at left and right sides and each forming a plurality of lugs, the suspension sections forming first through holes, the lugs forming second through holes, the backplane forming a plurality of suspending pegs corresponding to the first through holes, whereby the first through holes are mounted on the suspending pegs and the elastic members securel hold the second through holes and are mounted to the backplane so as to fix the optic film on the light guide plate;

wherein the elastic members are of a U-shape having an open end delimited by two second sidewalls in which mounting holes are defined, the backplane comprising mounting poles that are formed at locations corresponding to the mounting holes, the elastic members being respectively received through the second through holes and being respectively mounted to the mounting poles via the mounting holes so as to fix the optic film to the light guide plate; and wherein the two second sidewalls of each of the elastic members comprise a helical configuration formed in an end portion thereof remote from the mounting holes.

4. The backlight module as claimed in Claim 1, wherein the elastic members are made of plastics.

5. The backlight module as claimed in Claim 1, wherein the elastic members are made of rubber or silicone.

6. A backlight module, comprising: a backplane, a backlight source arranged inside the backplane, a light guide plate arranged inside the backplane to correspond to the backlight source, a reflector plate disposed on a bottom of the light guide plate, an optic film disposed on a top of the light guide plate, and a plurality of elastic members mounted to the backplane, the optic film having a top edge forming a plurality of suspension sections, the optic film having two first sidewalls respectively at left and right sides and each forming a plurality of lugs, the suspension sections forming first through holes, the lugs, forming second through holes, the backplane forming a plurality of suspending pegs corresponding to the first through holes, whereby the first through holes are mounted on the suspending pegs and the elastic members securely hold the second through holes and are mounted to the backplane so as to fix the optic film on the light guide plate;

wherein each of the elastic members comprises a bottom plate and two third sidewalls perpendicularly mounted to the bottom plate, the two third sidewalls being mutually perpendicular with an opening being formed in a connection therebetween, the two third sidewalls being arranged to be linear and each having an upper edge forming a second barb, the bottom plate forming a third through hole that is circular.

7. The backlight module as claimed in claim 6, wherein the backplane forms a mounting hole corresponding to the third through hole, a screw being applied to secure the elastic member to the mounting hole with the second barbs tightly engaging the second through hole formed in the lug to thereby fix the optic film to the light guide plate.

8. The backlight module as claimed in claim 1, wherein the optic film is provided at top and bottom edges with a plurality of suspension sections and each of the two first sidewalls of the left and right sides forms a lug at each of upper and lower ends thereof, the suspension sections forming first through holes, the lugs forming second through holes, the backplane forming a plurality of suspending pegs corresponding to the first through holes, the first through holes being respectively mounted to the suspending pegs, the elastic members securely holding the second through holes and being mounted to the backplane so as to fix the optic film to the light guide plate.

9. The backlight module as claimed in claim 3, wherein the first sidewalls of the left and right sides of the optic film each form one lug at an upper end thereof.

10. The backlight module as claimed in claim 3, wherein the elastic members are made of plastics.

11. The backlight module as claimed in claim 3, wherein the elastic members are made of rubber or silicone.

12. The backlight module as claimed in claim 6, wherein the first sidewalls of the left and right sides of the optic film each form one lug at an upper end thereof.

13. The backlight module as claimed in claim 6, wherein the elastic members are made of plastics.

14. The backlight module as claimed in claim 6, wherein the elastic members are made of rubber or silicone.

\* \* \* \* \*